Oct. 30, 1934.  E. C. HORTON ET AL  1,978,633
WIPER BLADE
Filed Aug. 6, 1931
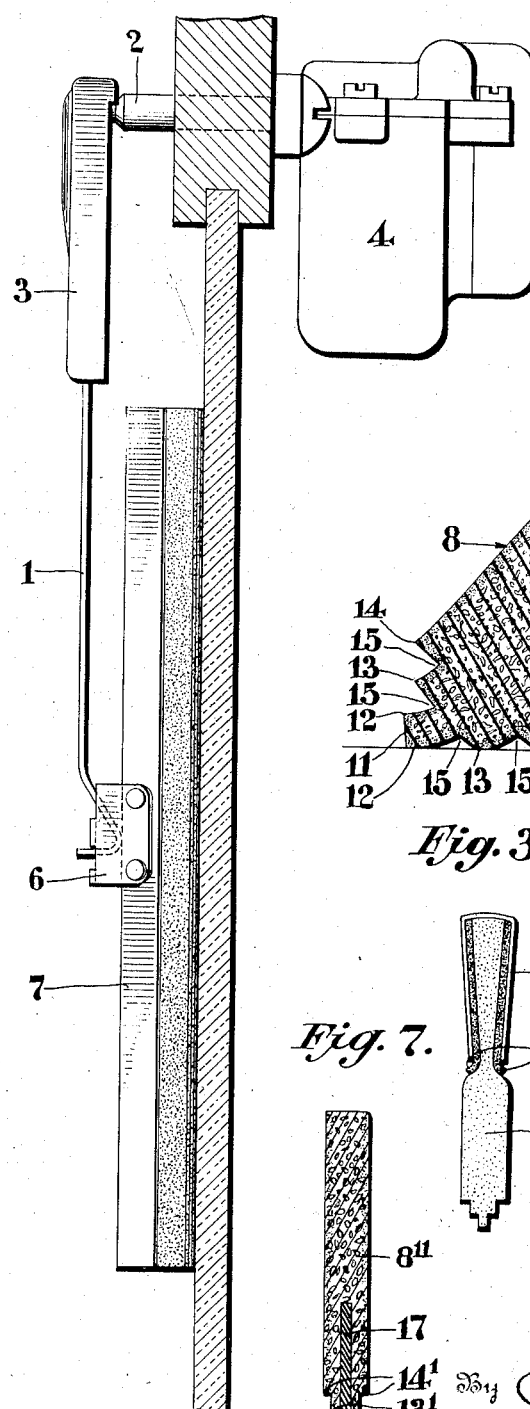
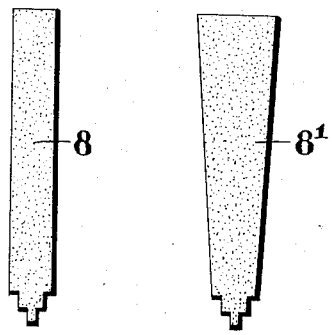
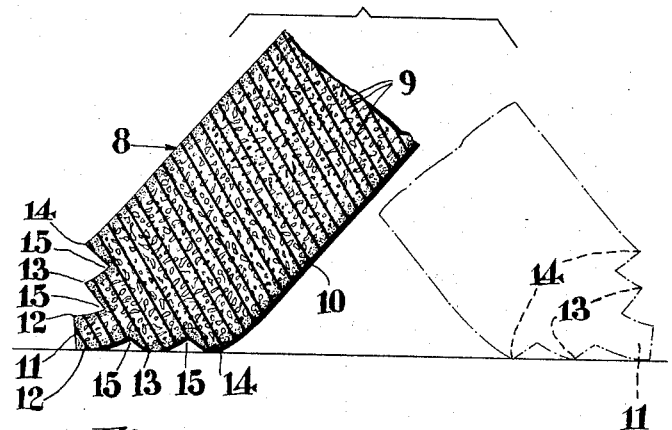
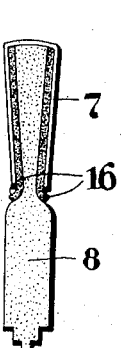
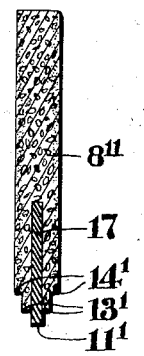
Inventors
Erwin C. Horton,
Henry Hueber,
By Bean Brooks + Henry.
Attorneys Patented Oct. 30, 1934

1,978,633

UNITED STATES PATENT OFFICE 1,978,633

WIPER BLADE

Erwin C. Horton, Hamburg, and Henry Hueber, Buffalo, N. Y., assignors to Trico Products Corporation, Buffalo, N. Y.

Application August 6, 1931, Serial No. 555,624

9 Claims. (Cl. 15—250)

This invention relates to a windshield wiper blade and particularly to a blade adapted for use in connection with automatic windshield cleaners wherein a power driven blade carrying arm is moved back and forth across the windshield glass under a definite and substantially constant pressure or tension so that the blade is reciprocated under a definite wiping pressure or contact with the glass.

Not infrequently, particles of dust and foreign matter collecting on the windshield glass will be pressed by the wiper blade against the glass so as to scratch and abrade the same since the resiliency or yieldability of the rubber wiping edge is not sufficient in itself to receive such particles. Further the rubber heretofore utilized, especially in the molded or extruded forms, has a body more or less hard and stiff and provided with a glazed surface which does not readily yield to such foreign particles to avoid scratching the glass, nor conform to the glass surface so that streaks of moisture remain to obscure the vision through the windshield.

The object of the present invention is to provide a windshield wiper blade which will insure a better, cleaner wiping action with less scratching of the glass.

In the drawing:

Fig. 1 is a partial sectional view through a windshield illustrating a windshield cleaner mounted thereon embodying a wiper blade constructed in accordance with the present invention.

Fig. 2 is a diagrammatic view illustrating, on an enlarged scale, the functioning of the improved wiper blade.

Figs. 3 and 4 are end elevations of blades depicting two different embodiments of the invention.

Figs. 5 and 6 are detail elevations of the rubber body constituting the wiping portions of the two blades depicted in Figs. 3 and 4.

Fig. 7 is a further modified form of wiper blade embodying a combined sponge and calendered rubber in the wiping contact.

In proceeding in accordance with the present invention a wiper carrying arm 1 is shown mounted on an actuator 2 and placed under proper or desired tension or pressure by a spring device generally indicated at 3 and shown more clearly in the co-pending application of Henry Hueber, Serial No. 410,601. The actuator or shaft 2 may be driven from a motor 4 by which the shaft is rocked to impart back and forth movement to the wiper carrying arm 1 in a path substantially parallel to the outer face of the windshield glass 5.

The lower or free end of the blade carrying arm 1 is connected by means of a clip 6 to the wiper blade. This connection permits a limited tilting action of the blade relative to the arm so as to incline or drag across the glass. The blade embodies a stiffening or backing element herein depicted in the form of a channeled bar or holder 7, and within the channel of the holder is disposed the wiper body 8 which makes wiping contact with the windshield glass.

This wiping body is formed of sponge rubber having incorporated therein a plurality of air or gas cells 9 to render the rubber body exceedingly soft and flexible. Sponge rubber is a well known commercial product and therefore needs no elaborate description, suffice it to say that it may be formed by such chemical treatment that during the curing operation a gas is liberated in the rubber composition to create a plurality of disjunctive gas cells extending throughout the mass and separated by thin walls. These walls may be ruptured, if desired, as by passing the cellular body between pressure rollers, thereby providing intercommunicating passages for the cells.

The wiping edge thus obtained affords a soft and very pliable contact with the glass and permits particles of dust, grit, and other foreign matter, which might tend to scratch the glass, to embed themselves within the wiping edge of the blade while the contact with the glass is maintained otherwise throughout the length of the blade. The outer surface of the wiper body 8 is condensed. This compactness of the surface occurs next to the wall of the mold or container, the term "mold" being used broadly to include extruding or other shaping of the body. The condensed surface, in effect, provides a skin 10 for the cellular structure within and substantially renders the body impervious to moisture and non-absorbent.

Such body and surface are soft to the touch and afford a readily yieldable and pliant surface and edge for wiping contact with the glass. The cellular structure is readily compressible and deformable so that an even wiping contact is obtained with the glass regardless of irregularities in the surface of the glass or the accumulation of gritty matter beneath the edge. The surface has a dull, unglazed finish and is readily stretched or distended and compressed or contracted.

The body 8 is shaped with an attenuated ipping edge 11, and by reason of such attenuation its flexibility is increased so that as the wiper blade is moved back and forth across the glass such attenuated wiping edge will lap its opposite side faces 12, alternately, down onto the glass and thereby increase the area of wiping contact. Stepped back from the wiping edge 11, and on each side thereof, is one or more auxiliary wiping edges 13 and 14 and as these auxiliary wiping edges are pressed or lapped into contact with the glass, under the tension of the resiliency in the carrying arm, they will flatten and broaden their contacts, because of the adhesion of the rubber to the glass due to the inherent softness and pliability of the sponge rubber. (This action is shown enlarged in Fig. 2.)

The wiping body is therefore provided with two series of wiping edges converging toward and into the central wiping edge 11 so that as the blade tilts to assume a dragging position, relative to the arm, the advance series of wiping edges 12, 13 and 14 will contact with the glass while the idle or inactive series of wiping edges will assume a more or less deformed relationship and be compressed toward one another while the active wiping edges will be relatively separated by reason of the adhesion and clinging of the sponge rubber to the glass.

In Fig. 2 the active edges are shown relatively separated while the inactive edges are shown relatively contracted or compressed. The sharp though soft angles of the wiping edges flatten out and thereby produce broadened wiping contacts with correspondingly increased wiping efficiency. As the blade tilts to its other position, the flattened wiping edges return to their original shape, which creates a surface disturbance or agitation tending to loosen and exclude any collected foreign matter for flowing off with the moisture. This action insures a clean blade. The several wiping edges of each series define water collecting channels in advance of each of the wiping edges, except the first, and these water collecting channels are likewise broadened out by reason of the inherent softness and stretchability of the sponge rubber.

The holder 7 is preferably of metal and the sides thereof define an axis about which the projecting sponge body may hinge. To avoid the edges of the holder embedding and cutting into the soft body there is provided on each side thereof and within the metal holder, a ply or strip 16 of non-sponge rubber, having a greater degree of hardness or stiffness so as to reinforce not only the flexible sponge body along this hinge line but also avoid the metal edges of the holder from cutting and unduly penetrating the soft body, such strips projecting slightly beyond the edges of the holder.

The soft wiper body may have its opposite sides substantially parallel as indicated in Fig. 5, or its sides may diverge away from the wiping edges, as indicated at 8′ to increase the thickness of that portion of the body which is to be embraced by the metal holder. Such a form of blade is shown in Fig. 4 wherein the wider or thicker edge of the rubber body is embraced and compressed by the metal holder 7. So compressing this thicker edge tends to crowd a portion of the cellular body along the free edges of the holder and thereby give the same a special thickness or reinforcement to guard against the metal holder unduly cutting into the body.

The softness of the sponge rubber body enables the wiping edge to closely follow the glass surface with exacting conformity and any particles of grit which may be collected by the wiping edge will embed themselves in the soft body so as to avoid heavy contact with the glass which would scratch and mar the surface thereof and obstruct the vision therethrough. As soon as the stroke of the blade is reversed the embedded grit or particles will be more or less projected from their embedded position as the rubber assumes its normal untensioned condition so that the particles will be free to flow off with the moisture.

In Fig. 7 is depicted a further modified form of wiper blade in which the sponge rubber body 8″ has its wiping edge 11′ stiffer than the wiping edges 13′ and 14′. The thin wiping edge 11 when composed wholly of sponge rubber, is exceedingly soft and flexible and in order to give this wiping edge, which is active on both strokes of the wiper blade, greater strength and durability the rubber which forms this wiping edge is given a different treatment or possesses different characteristics tending toward a longer period of usefulness for that particular edge. This edge 11′ may therefore be formed by incorporating a calendered strip 17 of rubber so that between the sponge rubber edges 13′ and 14′ there protrudes the wiping edge 11′ of calendered rubber or other comparatively tough or stiff material. The body of the calendered strip 17 extends well up into the sponge rubber body and gives some support to the otherwise very flexible and pliable sponge rubber body. This strip may extend well up into the metal holder 7 to reinforce the sponge rubber body along the edges of the channel holder.

During the cleaning action of the blade disclosed in Fig. 7 the relatively soft and pliable sponge rubber wiping edges 13′ and 14′ will contact with the glass in advance of the tougher and harder trailing wiping edge 11′ so as to remove much of the gritty matter from the glass preliminary to the passing over of said edge 11′. So that in this form we also obtain the advantage of embodying sponge rubber in the wiping contact, coupled with the wiping efficiency of the calendered edge 11′.

What is claimed is:

1. A windshield wiper blade having its wiping body portion composed of sponge rubber, the outer wiper surface of said sponge rubber having a substantially non-absorbent skin providing a substantially smooth surface for engaging the windshield glass in wiping contact.

2. A windshield wiper blade having a wiping edge composed of sponge rubber with the cells of the rubber compacted at its wiping surface to provide a smooth and substantially non-absorbent skin for engagement with a windshield glass.

3. A windshield wiper blade having a body of sponge rubber and a reinforcing body of tougher material associated therewith, said blade at the wiping edge thereof having the sponge rubber on opposite sides of the tougher material whereby the tougher material will support the sponge rubber against collapse due to wiping pressure.

4. A windshield wiper blade having a plurality of wiping edges, one of which is formed of sponge rubber and another of which comprises a wiping body less porous than sponge rubber and incorporated in the sponge rubber material.

5. A windshield wiper blade having spaced wiping edges formed of sponge rubber and an interposed wiping edge of stiffer rubber stepped relative to the sponge rubber wiping edge.

6. A windshield wiper blade having a sponge rubber body provided with a wiping edge of sponge rubber, and a body of tougher material incorporated in the sponge rubber body and extending beyond the first mentioned wiping edge to provide a companion wiping edge, the second body serving to reinforce the first body back from the wiping edges.

7. A windshield wiper blade having a sponge rubber wiping portion comprising two converging series of at least two wiping edges, the edges of each series defining therebetween a water-collecting channel, the outer surface of said stepped edges having a substantially non-absorbent skin enveloping and protecting the sponge rubber body.

8. A windshield wiper blade having a sponge rubber wiping portion comprising two converging series of at least two wiping edges, the edges of each series defining therebetween a water-collecting channel, the outer surface of said stepped edges having a substantially non-absorbent skin enveloping and protecting the sponge rubber body, and a body of tougher material incorporated in the sponge rubber body and extending beyond the aforementioned edges between the outermost edges of said series.

9. A windshield wiper blade having a sponge rubber wiping portion comprising two converging series of at least two wiping edges, the edges of each series defining therebetween a water-collecting channel, the outer surface of said stepped edges having a substantially non-absorbent skin enveloping and protecting the sponge rubber body, and a body of reinforcing material embedded in said sponge rubber body between the two converging series of stepped wiping edges.

ERWIN C. HORTON.
HENRY HUEBER.